United States Patent [19]

Mukhin et al.

[11] 4,168,917

[45] Sep. 25, 1979

[54] VIBRATOR

[76] Inventors: Zhores G. Mukhin, ulitsa Ippodromskaya, 31, kv. 154; Vladimir N. Vlasov, ulitsa Tikhvinskaya, 6, kv. 116, both of Novosibirsk, U.S.S.R.

[21] Appl. No.: 895,275

[22] Filed: Apr. 10, 1978

[51] Int. Cl.² .......................................... B01F 11/00
[52] U.S. Cl. .................................... 366/124; 366/600
[58] Field of Search ............... 366/124, 125, 126, 600

[56] References Cited

U.S. PATENT DOCUMENTS 3,348,278  10/1967  Jankovsky ........................... 366/124

FOREIGN PATENT DOCUMENTS 116744  4/1958  U.S.S.R. ................................. 366/124

Primary Examiner—Edward J. McCarthy
Attorney, Agent, or Firm—Lackenbach, Lilling & Siegel

[57] ABSTRACT

A vibrator, actuated by a pressure fluid to impart oscillations to a working platform carrying the material being handled, comprises a stationary base on which an elastic member is mounted on the side facing said working platform so as to adjoin the working platform, said elastic member being made as a closed-contour collar having a lateral surface. Provision is also made for a working chamber defined by said base and said elastic member and communicating with a source of pressure fluid. It is the pressure fluid which makes the elastic member oscillate and imparts vibrating motion to said working platform. The collar has at least one outlet opening with an elastic sealing lip, said lip being located near said lateral surface of the collar and arranged in such a manner that, when said collar starts deflecting from the initial stationary position, said lip of said opening is tightly pressed against said base or said working platform, and, at the end of the collar deflection, the lip defines on at least one portion thereof a passageway for said working chamber to communicate with the atmosphere.

8 Claims, 10 Drawing Figures

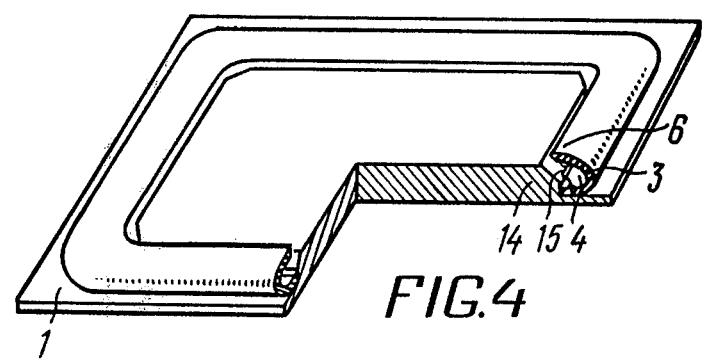
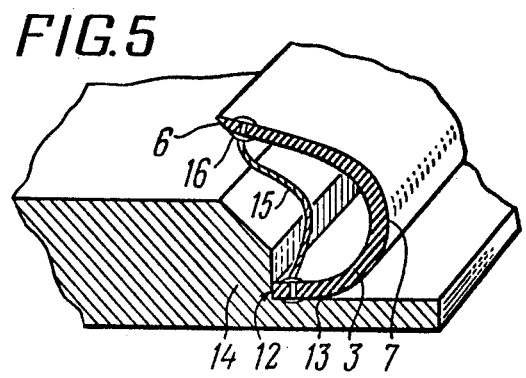

VIBRATOR

FIELD OF THE INVENTION

The present invention relates to vibrators actuated by a fluid and has particular reference to vibrators actuated by compressed air. Such vibrators are made use of, in particular, for driving vibration-assisted material handling machinery, such as jigging conveyers and vibrating feeders adapted for discharging and loading loose materials from blocks, hatches and containers.

DESCRIPTION OF THE PRIOR ART

Prior-art jigging conveyers and vibrating feeders have a working platform installed on soil or supported by a frame, or bearings or else mounted on a suspension either horizontally or at an angle of up to 20° to the horizontal. A vibrator is mounted either on soil beneath the working (vibrating) platform or directly on the platform. In the latter case the vibrator is situated either approximately at the center of the platform or at one of the ends thereof, so as to impart oscilations to the platform directed either normally to its surface or at angle of 30° thereto. One of the ends of the vibrating platform is located under the discharge hopper and the other end is disposed at the place of loading the loose material into transport vehicles (such as cars, motor trucks, and the like).

Vibration-assisted material handling machinery make frequent use of unbalanced-mass vibrators (cf., e.g., USSR Inventor's Certificate No. 275,835 81E.51) provided with an electrically, pneumatically or hydraulically powered rotary drive motor. The unbalanced-mass vibrator comprises off-balanced weights or members held in position on the motor shaft or on the shaft of its own. In the latter case the shaft runs in bearings mounted on the plate. To generate directional oscillations one must provide two parallel shafts carrying off-balanced weights and make said shafts rotatable in opposite directions through a gear drive so that the off-balanced weights should rotate in opposition.

The motor is usually mounted directly on the vibrator plate, or on a self-contained stationary fixed base, and its shaft is connected to the shaft of the off-balanced weights through a flexible shaft, universal-joint drive, or the like.

Such vibrators develop impact-free alternating sinusoidal loads which impart oscillating motion to the vibrating platform, whereby the loose material being handled is conveyed.

The disadvantages inherent in the aforesaid vibrators reside in their sophisticated construction, great weight and low service reliability when operating in dust-laden, abrasive or corrosive atmospheres, which is generally the case in mine conditions. Furthermore, such vibrators are devoid of means for automatic coordination of an impellent force with actual oscillations performed by the vibrating platform which results in overloading of the vibrator. In this case the motor is not infrequently liable to run at starting duty or stall. Such as operating duty in conjunction with heavy vibratory loads causes a premature failure of the motor. In order to reduce the bad effect of said factors, one has to increase the power rating of a rotary motor which in turn leads to overloading of the off-balanced weitht shaft bearing and their rapid failure. Overloads are liable to occur at the moments when the vibrator impellent force fails to coincide with the elastic vibrating forces of the vibrating platform as to the direction of application.

Both air- and liquid-operated rotary motors, as a rule, incorporate a costly precision kinematic pair, such as rotor-stator, piston-cylinder, or gear wheels. To protect such a pair against rapid wear one must carry out careful cleaning of the power carrier, e.g., with compressed air, continuously feed lubricant to all rubbing surfaces and exercise permanent care and maintenance thereof. In addition, such motors are but of low reliability when operated in moist corrosive or dust-laden atmospheres occurring, e.g., in mines.

To provide more efficient handling of loose materials impact disturbing force should be applied to the vibrating platform. To carry this concept into effect some air- or hydraulic-operated piston-type impact vibrators have been devised (cf., e.g., USSR Inventor's Certificate No. 340,600 B65g 27/22) that are known to comprise a housing with a cylinder, wherein an impact-type piston is free to travel, and the power carrier inlet and outlet systems. Sometimes it is the piston itself that performs the function of a valving member, for which purpose special admission ports and shutoff lands are provided on the piston and in the cylinder.

Such vibrators likewise require adequate cleaning of the power carrier and incessant lubrication of the piston assembly and operate badly when exposed to moist or abradant atmospheres. The travelling speed of the impact-type piston just before impact as a rule exceeds 5 or 6 m/s which adversely affects the strength of both the vibrator and the vibration-assisted handling means and results in the onset and rapid development of microcracks in the material of the component parts of both machines and leads eventually to breakage. To reduce the piston speed prior to impact, one must increase the diameter of both the piston and the cylinder and this cannot be justified from economical viewpoint. In addition, reasonable constructional arrangement of the power carrier valving members is hampered.

Also known in the art are diaphragm vibrators (cf., e.g., USSR Inventor's Certificate No. 438,793 E21F 13/08), comprising a power chamber formed by the vibrator housing and a diaphragm (membrane). This diaphragm relays forces to the vibrating platform of the vibration-assisted handling means while acting through an intermediate piece, and flow of the power carrier is controlled by a directional spool valve, wherein the spool travels under the effect of the diaphragm. Such vibrators are not subject to some of the afore-mentioned disadvantages; nevertheless, constructional arrangement of the oulet valving device is hampered due to too short a displacement of the diaphragm. The directional spool valve of such vibrators likewise requires cleaning of the power carrier, an uninterrupted feed of lubricant and protection against penetration of abrasive solids from the surrounding atmosphere.

Another diaphragm vibrator is known (cf., e.g., USSR Inventor'Certificate No. 249,270 81E.52) to impart oscillating motion to a vibration-assisted material handling means, wherein the working platform is mounted on means that enable it to travel longitudinally and is provided with a spring actuator to return said platform to the initial position. The vibrator features a housing fixed stationary with respect to the working platform. The working chamber inside the housing has one of its ends made as an elastic diaphragm (membrane) fixed in place along the periphery thereof. The housing accomodates the valving device to admit pressure gas into the working chamber. A stiff ring is held at the center of the diaphragm whose opening communicates with the working chamber. The ring has a sealing land to which the valve adjoins and is adapted to travel alongside with the central portion of the diaphragm until it meets a travel restricting stop provided on the housing. The directional control valve is located on the rod which is held to the end face of the working platform.

During the vibrator operation compressed air is emitted to pass through the inlet device into the working chamber to actuate the diaphragm which deflects due to its pliability so that its central portion is displaced to a maximum amount along with the stiff ring held thereto. As a result, the stiff ring with its sealing land gets forced against the valve to relay forces developed in the central portion of the diaphragm, to the working platform through the agency of said valve and the rod thereof. This force urges the working platform to travel longitudinally against the return spring to compress it, with the result that the stiff ring meets the stop and stands still, thus restricting further travel of the diaphragm. Meanwhile, the working platform keeps moving under its own momentum, thus entraining the valve therewith. Thereby the valve comes off the diaphragm ring, and compressed gas makes its way from the working chamber through a gap established between the valve and the diaphragm ring, and the central hole of the diaphragm ring. By that moment compressed gas ceases to be fed into the working chamber by virtue of the admission device provided in the vibrator housing. Thereupon the diaphragm along with the ring is urged to return to the initial position under the effect of elastic forces of its own or due to any specific means. The working platform is urged by the return spring to perform in reverse until the valve is forced against the diaphragm ring, whereby the working chamber becomes hermetically sealed and compressed air gains admission thereto, whereupon the entire cycle is repeated.

The afore-discussed vibrator, however, failed to find widespread application as being an inadequately high-power one. Forces developed in its working chamber cannot be relayed completely through the diaphragm to its central ring and the working platform, as the diaphragm effective area diminishes as fast as it deflects. This is accounted for by the fact that the diaphragm starts elongating from its periphery towards the center as far as its stretching strain limit, thus participating no longer in the useful work of traversing the working platform.

Moreover, said vibrators are sophisticated in design, feature complicated admission and discharge devices which are operationally unreliable when exposed to dust- and abradant-laden atmospheres and are liable to rapidly wear out.

SUMMARY OF THE INVENTION

It is a primary object of the present invention to provide a vibrator operating reliably when exposed to corrosive, moist, dust- and abradant-laden atmospheres.

It is another object of the present invention to provide a vibrator simple in construction light in weight and featuring low cost, as well as a being capable of manufacture from non-corrodible materials.

It is another object of the present invention to provide a vibrator that is simple to attend and needs no maintenance and lubrication nor any protective means against the effect of surrounding atmosphere.

It is another object of the present invention to provide a versatile vibrator that would be serviceable in a variety of machinery, mechanisms and devices of diverse purposes and uses, wherein the operative unit has to perform oscillating motion at a predetermined amplitude, involving steplessly variable oscillation frequency and magnitude of the disturbing force.

The essence of the invention resides in a vibrator actuated by a pressure fluid to impart oscillations to a working platform carrying the material being handled. A working chamber communicates with the source of pressure fluid and has one of its walls made as an elastic member adapted to oscillate under the effect of pressure fluid and to interact with the working platform so as to impart vibrating motion thereto. According to the invention, the working chamber is defined by a stationary fixed base and an elastic member located thereon on the side facing the working platform and adjoining the working platform. The elastic member is made as a closed-contour collar having a lateral surface and provided with at least one outlet opening with elastic sealing lips, said lips being located near the lateral surface of the collar and arranged in such a manner that, when the collar starts deflecting from the initial stationary position, the lip of said opening is tightly pressed against the base or the working platform, and at the end of the collar deflection, the lip defines on at least one portion thereof a passageway for the working chamber to communicate with the surrounding atmosphere.

Such an embodiment of the vibrator makes it possible to widely increase the effective area of the working chamber which acts upon the working platform and thereby attain a directly proportional increase in the vibrator disturbing force imparted to the working platform. The resultant vibrator features simple construction, light weight per unit power, low cost, high operational reliability when exposed to corrosive and abrasive-laden atmospheres and requires no special protection and lubrication.

It is preferable that the collar be provided with a stop to restrict deflection of the collar lip and that said stop be located at the place where at least one passageway is established for the working chamber to communicate with surrounding atmosphere.

The above feature enables one to attain a clear-cut starting of discharge of pressure fluid from the working chamber and, consequently a positive action and reliable operation of the vibrator.

It is preferable that the collar fixed stationary on the base in such a manner that at least one outlet opening would face the working platform.

Such a mode of holding enables the collar to have a simple shape, even a mere plain one, and, thereby, to minimize the useless volume of the working chamber by resorting to simple constructional techniques. This feature reduces the consumption of pressure fluid actuating the vibrator.

In some particular case it is preferable for the collar to be held stationary on the working platform in such a manner that at least one outlet opening would face the base.

Such a constructional feature preferable when the working platform is situated above the base and hard to remove foreign impurities from the surrounding atmospere or entrained along with the pressure fluid are liable to accumulate therein. Top arrangement of the collar enables one to improve the removal from the working chamber of alien impurities, as the impurities fall onto the base by their own weight and are free to be covered away by the same pressure fluid.

As a result of carrying this invention into effect a vibrator has been provided, featuring high power-to-weight ratio, as well as steplessly variable vibration frequency and magnitude of the vibratory force applied. Such vibrators operate in full coordination with actual oscillations performed by the working platform, they require no special means for protection against the effect of surrounding atmosphere and these vibrators do not require cleaning of pressure fluid used, lubricating and regular maintenance, and are capable of stable and reliable operation in moist, corrosive, dust- and abrasive-laden atmospheres.

DETAILED DESCRIPTION OF THE INVENTION

In what follows the invention is illustrated in a detailed description of a number of exemplary specific embodiments thereof given with reference to the accompanying drawings, wherein:

FIG. 4 is a perspective, fragmentarily cutaway view of the vibrator less the working platform, according to the invention;

FIG. 5 is a perspective view showing the mode of attachment of a stop restricting the deflection of the collar elastic sealing lip;

DETAILED DESCRIPTION OF THE INVENTION

In describing exemplary embodiments of the present invention as illustrated in the appended drawings, specific narrow terminology is resorted to for the sake of clarity. It should be understood, however, that each of the terms applied covers all equivalent elements operating in a similar way and employed to accomplish the same objects. Thus the term "collar" applies equally to every pliable or elastic member of various shapes which are capable of sealing hermetically the working chamber in at least one place under the effect of pressure exerted by the power fluid in said chamber.

Figure 1:
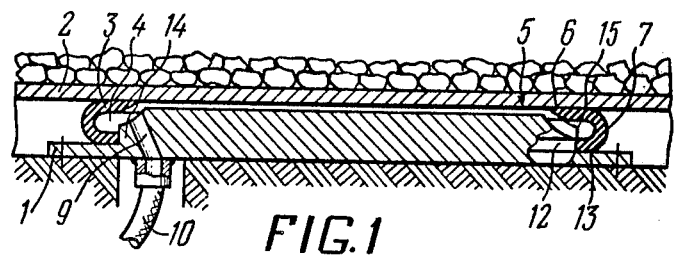
FIG. 1 is an elevational, sectional view of a vibrator with a working platform carrying the material being handled, according to the invention.
Figure 2:
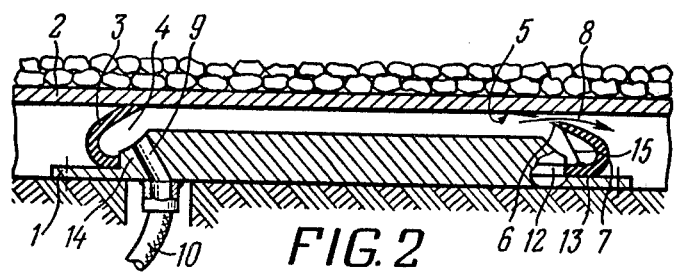
FIG. 2 is an elevational sectional view of the vibrator of FIG. 1 featuring a top arrangement of the working platform.
Figure 3:
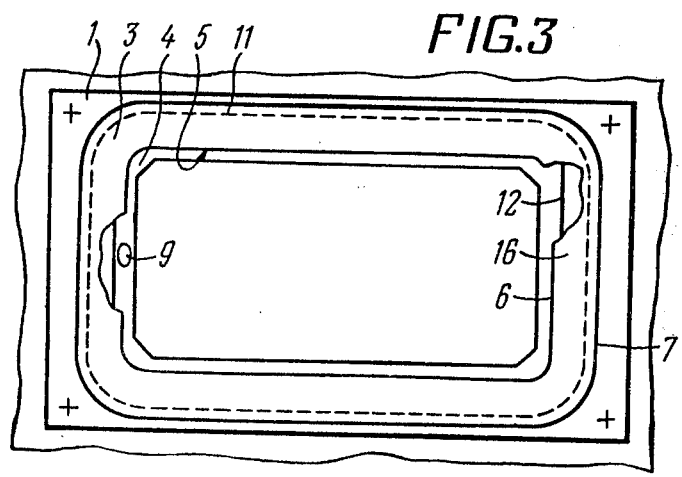
FIG. 3 is a top, plan view of the vibrator of FIG. 1 with the working platform removed.

Reference being now directed to FIGS. 1 through 3, the vibrator of the invention features a base 1 usually fixed stationary and a working platform 2 (FIGS. 1 and 2) situated thereabove. A collar 3 is interposed between the base 1 and the working platform 2 to defined a working chamber 4 adapted to be hermetically sealed. The collar 3 has at least one outlet opening 5 with an elastic sealing lip 6 located near a lateral surface 7 of the collar 3. The elastic sealing lip 6 of the outlet opening 5 of the collar 3 is arranged in such a manner that, when the collar 3 starts deflecting from the initial stationary position, the sealing lip is tightly pressed against the base 1 or the working platform 2, as can be seen from FIG. 1, and at the end of the collar deflection, the lip 6 defines on at least one portion thereof a passageway 8 (FIG. 2) for the working chamber 4 to communicate with the surrounding atmosphere. The working chamber 4 communicates with a source (not shown) of pressure fluid through a throttling portway 9 (FIGS. 1 through 3) and a hosepipe 10 (FIGS. 1 and 2). The hosepipe 10 can be coupled with the working platform 2, the collar 3 or, as is the case in FIGS. 1 and 2, with the base 1. The throttling portway 9 may also be made in the abovesaid components, though use may be made instead of said portway also of a special admission device of any suitable type, said device being not shown in the drawings. The working chamber 4 is bounded along its edges in the plane of the working platform 2 by the side surface of the collar 3 and may have any shape, such as rightangular, as is shown in FIGS. 3 and 4, or some other shape, e.g., circular, square, oblong which is determined by the shape and size of the machine with which the vibrator has to operate. The aforesaid shape and size of the working chamber 4 in the plane of the working platform 2 define the effective area of the working chamber 4 and the pressure of fluid therein which is relayed to the working platform 2. The abovesaid effective area 11 of the working chamber 4 is shown or a dashed line in FIG. 3 which may practically be assumed to coincide with the boundary line of contact of the lateral surface 7 of the collar 3 with the working platform 2. The force exerted by the pressure fluid in the working chamber 4 upon the working platform is directly proportion to the effective area 11 of the working chamber 4 and to the pressure of power fluid therein.

The collar 3 as illustrated in FIGS. 1 through 3 has an O-shape, is arranged along a closed contour of the working chamber 4 and is provided with one opening 5, which faces the working platform 2 and is hereinafter referred to as the "top opening", the movable elastic lip 6 of said opening being tightly pressed against the working platform 2, and with one opening 12 which faces the base 1 and is hereinbelow termed the "bottom opening", a lip 13 (FIGS. 1 and 2) of said opening 12 being tightly pressed against the base 1. The collar 3 is prevented from lateral displacement with respect to the base 1 by a shoulder 14 provided on the base 1 and adapted to enter the interior of the working chamber 4. In addition, the shoulder 14 due to its protruding into the chamber 4 reduces the useless (ineffective) space thereof. If the working platform 2 is devoid of any attachment elements to support it in a definite position, it is expedient to hold the working platform to the collar 3 which in turn is practicable to attach to the base 1 which simplifies the construction of the vibrator (the feature being not represented in the drawings). Either of the openings, i.e., the top opening 5 or the bottom opening 12, or also both of them may be used as outlets, viz., such openings that are adapted for used pressure fluid to discharge from the working chamber 4 into the surrounding space. This is attained due to the fact that, when the working platform 2 is in the position most distant from the base 1, the movable elastic sealing lip of at least one outlet opening of the collar 3 on at least one portion thereof establishes a passageway 8 for the working chamber 4 to communicate with surrounding atmosphere. FIGS. 1 through 3 illustrate an embodiment of the vibrator, wherein used as an outlet opening is made of the top opening 5 of the collar 3 whose movable elastic sealing lip 6 is pressed against the working platform 2. When the working platform 2 is all the way upwards as shown in FIG. 2, it comes off the elastic sealing lip 6, with the the result that the outlet passageway 8 is established between said lip 6 and the working platform 2 for the working chamber 4 to communicate with the surrounding atmosphere. The passageway 8 can be established at the end of traversing of the working platform 2 by a plurality of ways, e.g., by increasing the stiffness of the elastic lip 6 on at least one portion thereof by, for example, increasing the thickness of modifying the shape of said lip, or else by appropriately selecting the material thereof. The stiffness of the lip 6 must be selected proceeding from the prerequisite that the pressure of the power fluid in the working chamber 4 be not high enough for an excess folding back of the elastic lip 6 beyond its extreme position corresponding to a maximum folding-back, so that the passageway 8 should form between said lip and the working platform 2. The above prerequisite may be satisfied by a closer position of said elastic lip 6 to the lateral surface 7 of the collar 3. As a result, said lip 6 has a smaller width and a lower rate of elastic deflection.

The above prerequisite can be satisfied in another way, viz., by making use of a special stop restricting the amount of deflection of the elastic lip 6 fashioned as, for example, a flexible tie-piece 15 as represented in FIGS. 4 and 5, said tie-piece being held to the elastic lip 6 at points 16 (FIGS. 3 and 5) and on the other side being held to the base 1 or to the opposite lip 13 of the collar 3. The length of the flexible tie-piece 15 is selected so that it be tensioned on a required length of travel of the lip 6 to prevent the lip 6 from further folding back, thereby providing for the establishment of the outlet passageway 8.

To obtain the required flow passage area of the outlet passageway 8 for used pressure fluid to quickly discharge from the working chamber into surrounding space, one must increase the constructional length of the portion where the outlet passageway 8 is to be formed. This is especially required in the case of a short working stroke of the working platform 2 which is defined by the vibrator operating conditions. In the vibrator construction proposed herein the outlet passageway 8 may be made throughout the entire perimeter of the working chamber 4 so that the flow passage area of the passageway 8 will ensure normal vibrator operation at an effective stroke of the working platform 2 under 2 or 3 mm and an oscillation frequency of the vibrator exceeding the range from 50 to 200 Hz. This proves to be practicable with compressed gas at a conventional pressure from 5 to 8 kgf/cm$^2$ used as a pressure fluid.

In order to adjust the moment at which the outlet passageway starts to be formed to suit the situation of the working platform, a stop 17 (FIG. 6) restricting the amount of deflection of the lip of a collar 18 may be provided with a regulator 19 which may be made as, for example, a screw mounted in a base 20, the stop 17 being held to one of the ends of said screw restricting the deflection of the lip of the collar 18, the other end of said screw brought on the outside of the vibrator carrying the regulator 19 to control the traversing of the stop 17 and to fix it in position.

FIG. 16 illustrates an embodiment of the vibrator featuring a collar 18 of a simple flat shape, said collar being held hermitically to a base 20 by, for example, a cover plate 21 in such a way that at least one outlet opening 22 thereof faces a working platform 23. Such an arrangement renders the manufacture of the collar 18 and the vibrator as a whole simpler and cheaper.

Figure 7:
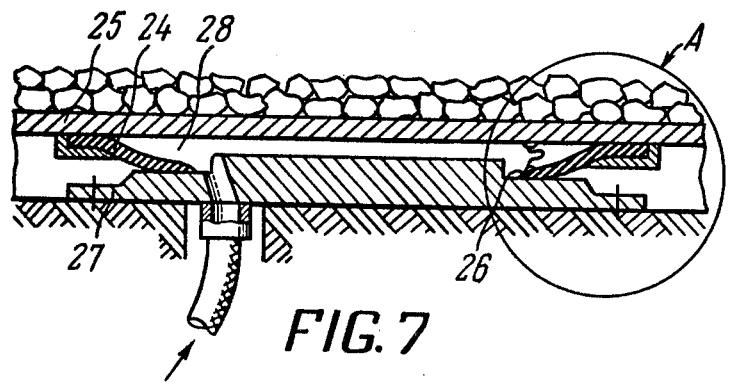
FIG. 7 is an elevational sectional view of a vibrator according to the invention, featuring the collar made fast on the working platform.
Figure 8:
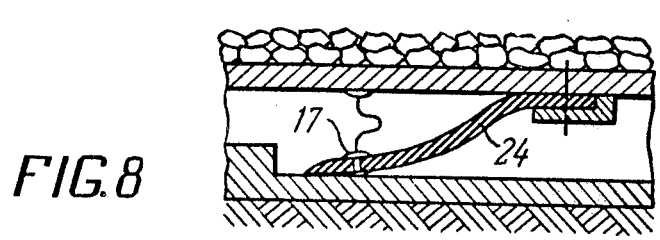
FIG. 8 is the unit A in FIG. 7.

FIG. 7 shows another embodiment of the vibrator, wherein a collar 24 is fixed stationary and hermetically on the working platform 25 itself in such a way that at least one outlet opening 26 thereof faces a base 27. Such a construction is reasonable when the vibrator is to be mounted on the object with which it operates. This being the case, the stop 17 for restricting the deflection of the lip of the collar 24 may be made as shown in FIG. 8.

Such an arrangement of the vibrator also improves the conditions for a working chamber 28 to get rid of various foreign particles entrained therein by the pressure fluid or resulting from soiling of the chamber by the surrounding atmosphere.

Figure 9:
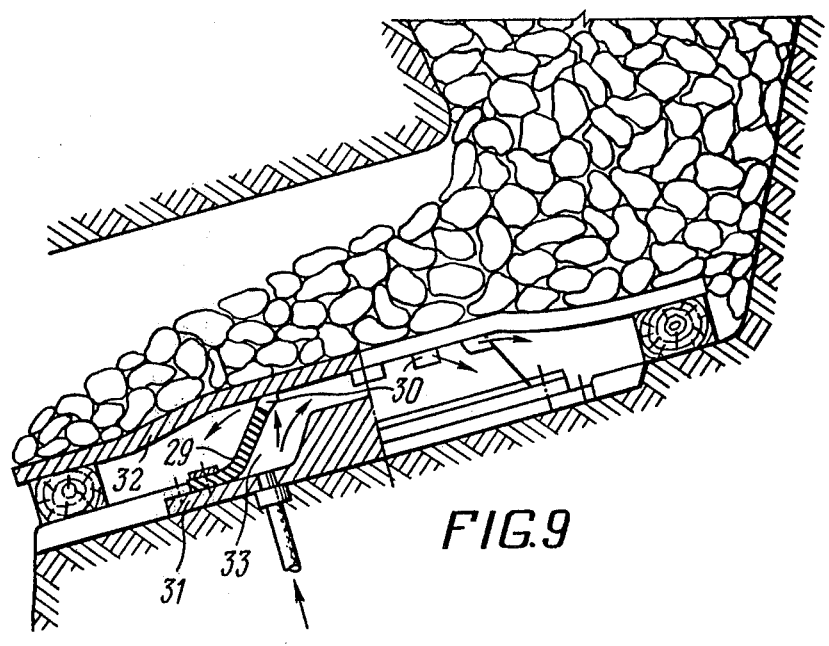
FIG. 9 is a elevational sectional view of a vibrator according to the invention, featuring the collar having a plurality of outlet openings.

FIG. 9 represents one more embodiment of the vibrator, wherein a collar 29 has a plurality of outlet openings 30 located closer to the lateral surface thereof, in particular, closer to the plate of its attachment.

Figure 10:
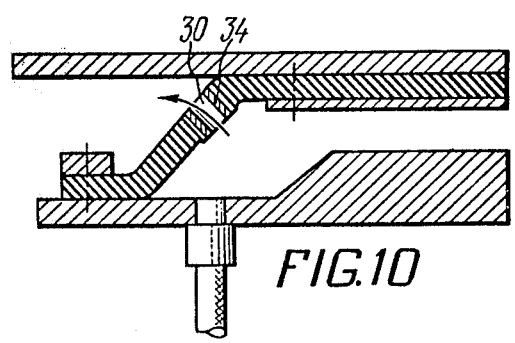
FIG. 10 is an elevational sectional view of a vibrator according to the invention, featuring the lips of the collar outlet openings sealed with a more wear-resistant material.

The outlet openings 30 may be of any reasonable shape and may feature any reasonable plan arrangement, the number of said openings depending upon constructional reasons. The collar 29 may have a mere flat shape and be held to a base 31 or to a working platform 32 along the periphery of the working chamber 33, or may have a plurality of outlet openings 30 located in the place where used pressure fluid should preferably be discharged from the working chamber 33. Provision of the collar 29 with a number of outlet openings 30 facilitates the operation of the elastic lips of the openings 30 as lower stretching forces are liable to arise in the material thereof when the lips are folded all the way back. This results in a longer service life of both the collar 29 and the vibrator. The elastic lips of the outlet openings 30 may be reinforced with more wear-resistant material 34, as shown in FIG. 10.

In the afore-mentioned embodiments (FIGS. 1 through 10) only some of the practicalbe versions of the vibrator and its collar have been considered. It should be understood that in its multiformity the collar may have any reasonable shape insuring hermetical sealing of the working chamber during traversing of the working platform and periodic communication of the working chamber with the surrounding atmosphere for used pressure fluid to discharge. The collar ma be made of a pliable or elastic material, such as rubber, rubberized cloth, polymer and even metal, or a combination thereof.

The vibrator as illustrated in FIGS. 1 through 3 operates as follows.

Figure 6:
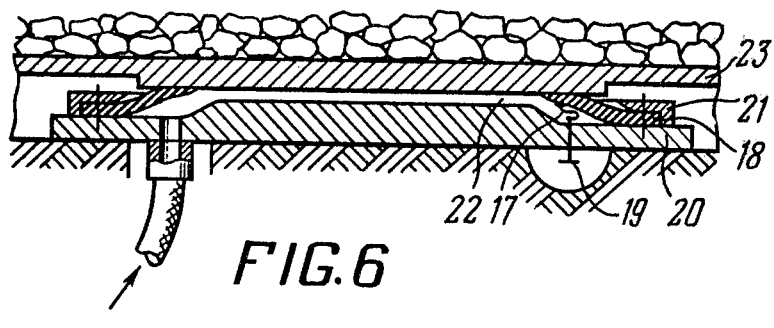
FIG. 6 is an elevational sectional view of a vibrator, according to the invention, featuring a flat collar held to the base.

Assume that the initial position is that illustrated in FIGS. 1, wherein the working platform 2 is in its bottommost position and the movable elastic lip 6 of the outlet opening 5 of the collar 3 is pressed against the working platform 2 by virtue of its resilient nature. Once the admission of pressure fluid to the vibrator has been established by means of a starting device such as, for example, a control valve (not shown), said pressure fluid starts flowing along the hose-pipe 10 and the throttling portway to pass into the working chamber 4 to build up a pressure therein. Said pressure causes the elastic lip 6 of the collar 3 to force against the working platform 2 and the lip 13 to force against the base 1, thus hermetically sealing the working chamber 4. The pressure of the power fluid effective in the working chamber 4 acts upon the working platform 2 on the side of the outlet opening 5 and through the lips 6 forced thereagainst along the contour of the effective area 11 (FIG. 3) and starts moving it up. The elastic lips 6 become folded back by the pressure effective in the working chamber 4 and accompany the travelling working platform 2 while being pressed thereagainst, thus hermetically sealing the working chamber 4. The working platform 2 starts rapid upward traverse, thus raising the material carried thereby. With this accelerated upward motion of the working platform 2, the pressure of the power fluid in the working chamber 4 drops due to the increased space thereof and the limited inflow of pressure fluid effected by the throttling portway 9. Then the upward motion of the elastic lip 6 along with the working platform 2 ceases on a constructionally predetermined length of pathway of said platform in at least one place thereof, this being either due to the resilient nature of the lip itself or by virtue of the special stop 15 restricting the amount of the lip deflection, so that the large-area outlet passageway 8 is established between the lip 6 and the working platform 2. Then the power fluid by virtue of its pressure starts escaping from the working chamber 4 through the passage 8 into the surrounding atmosphere, whereby the pressure in the working chamber 4 falls rapidly to zero. Upon this pressure drop in the working chamber 4 the elastic lips 6 tends to resume their initial position, i.e., they start travelling towards the base 1, thus contributing to better cleaning of the working chamber 4. At the same time the pressure fluids keep passing through the throttling portway 9 into the working chamber 4 but can no longer build up a pressure therein as the working chamber 4 is communicating with surrounding atmosphere. To reduce the consumption rate of pressure fluid, the throttling portway 9 may be substituted for by a valving device designed to cease the feeding of pressure fluid into the working chamber 4 upon the working chamber 4 communicating with surrounding atmosphere. The working platform 2 may for a time move upwards under its own momentum and, having used its reserve kinetic energy, it starts moving down under its own weight and the weight of the material being handled, or by virtue of some special means, such as, for example, springs (not shown). While traversing over the bottommost section of its downward pathway, the working platform 2 comes in contact with its lower surface and with the elastic lip 6, whereupon the working chamber 4 becomes hermetically sealed by virtue of the pressure fluid admitted to pass thereinto. If a liquid is used as a pressure fluid, the working platform 2 stops in its bottommost position as fast as possible. When a compressed gas is used as a pressure fluid the downward motion of the working platform 2 is decelerated at some lower rate as the gas in the working chamber 4 starts to be compressed and a fresh amount of compressed gas is being fed thereinto. Once the working platform 2 has stood still under the effect of the pressure effective in the working chamber 4, it starts moving upwards again, and the entire cycle is repeated. While performing oscillating motion the working platform 2 imparts said motion to the material being handled. When operating with compressed gas, one may attain an impact interaction of the working platform 2 at the end of the downstroke thereof with the base 1 through, for example, the shoulder 14. To damp the shock, an elastic padding may be placed between the shoulder 14 and the working platform. To intensify the force of impingement, it is necessary that the ineffective (dead) space of the working chamber 4 be as large as possible so as to minimize the effect of the decelerating moment resulting from the pressure and gas compression occurring in the working chamber. To contribute to the above favorable effect use may be made of the spring to return the working platform to the initial position. Positive return of the working platform by special means must be used to when the vibrator is heavily inclined or arranged vertically. When the collar 3 is shaped otherwise, for example, flat, as shown in FIG. 6, or when the collar 29 has a plurality of the outlet openings 30 (FIG. 9), the vibrator operates in a similar way, with the exception that in the former case used pressure fluid is discharged through a number of the outlet openings 30 at a time. When the collar 24 is held to the working platform 25 (FIG. 7), the vibrator likewise operates in the same way, with the exception that the outlet passageway is established on the side of the base 27 and, consequently, a periodic hermetical sealing of the working chamber 28 likewise occurs on the side of the base 27.

The nature of vibrating motion performed by the working platform 23 (FIG. 6) can be regulated by appropriately throttling the admission of pressure fluid by means of, for example, a starting valve, or by the regulator 19 of the stop 17 restricting the deflection of the collar 18, or by both. Such a regulating action in combination with the constructional arrangement of the working chamber enables one to provide vibrators featuring a rather broad range of performance characteristics.

Thus, one may obtain both low and rather high frequencies of vibrating motion imparted to the working platform 23 within practically any preset magnitude of the disturbing force applied.

The vibrators may incorporate working platforms having a large useful area and designed adapted for carrying very large amounts of and weights of the material being handled.

FIG. 9 illustrates one of the possible applications of the proposed vibrator for actuating a vibration-assisted material handling means, in particular, a vibrating feeder operating in a discharge mine for letting rock mass discharge from the block by gravity, hauling and loading into mine cars or some other transport vehicles. In this case the working platform 32 should have a larger area to serve as the vibrating plate of the feeder.

It should be understood that the foregoing disclosure of some embodiments of the present invention, as illustrated in the drawings and described hereinabove, relates to only some of the possible implementations thereof that would be preferable in some cases or other. Thus, some other modifications may be made use of as to the shape, size and arrangement of separate components and elements thereof. For instance, the components and elements thereof illustrated in the drawings and described in the above disclosure may be substituted for by the equivalent ones, the position of some individual components and elements thereof may be changed, some individual elements of the present invention may be used irrespective of one another, all this, however, being done without departing from the spirit and scope of the invention as set forth in the claims that follow.

Apparent full-scale models of the vibrator have been made according to the invention which have been subjected to comprehensive tests in handling various loose materials by vibration-assisted material handling means to compare it to some other vibrators used for actuating said means. Tests and practical trials have shown the proposed vibrator to operate well and take reliable under any working conditions when exposed to moist, dust- or abrasive laden and corrosive atmospheres, even when pressure fluid entrains a large amount of soft and hard foreign impurities, such as rust and sand. The vibrator of the invention has not been found to be inferior to the known vibrators as to any other performance characteristics thereof.

What we claim is:

1. A vibrator actuated by a pressure fluid to impart oscillations to a working platform carrying the material being handled, comprising:
   a stationary fixed base; and
   an elastic member positioned on said base on a side facing said working platform so as to adjoin the working platform, said elastic member being made as a closed-contour collar having a lateral surface,
   a working chamber being defined by said base and said elastic member and communicating with the source of pressure fluid, the pressure fluid making the elastic member oscillate and imparting vibrating motion to said working platform,
   at least one outlet opening in said collar being provided with an elastic sealing lip, said lip being located near said lateral surface of the collar and arranged in such a manner that, when said collar starts deflecting from an initial stationary position, said lip of said opening is tightly pressed against said base, and, at the end of the collar deflection, the lip defines on at least one portion thereof a passageway for said working chamber to communicate with the surrounding atmosphere.

2. A vibrator actuated by a pressure fluid to impart oscillations to a working platform carrying the material being handled, comprising:
   a stationary fixed base; and
   an elastic member positioned on said base on a side facing said working platform so as to adjoin the working platform, said elastic member being made as a closed-contour collar having a lateral surface,
   a working chamber being defined by said base and said elastic member and communicating with the source of pressure fluid, the pressure fluid making the elastic member oscillate and imparting vibrating motion to said working platform,
   at least one outlet opening in said collar being provided with an elastic sealing lip, said opening being located near said lateral surface of the collar and arranged in such a manner that, when said collar starts deflecting from an initial stationary position, an edge of said opening is tightly pressed against said working platform, and, at the end of the collar deflection, the lip defines on at least one portion thereof a passageway for said working chamber to communicate with the surrounding atmosphere.

3. A vibrator as claimed in claim 1, wherein said collar is provided with a stop to restrict deflection of the collar lip, said stop being located at the place where said at least one passageway is established for said working chamber to communicate with the surrounding atmosphere.

4. A vibrator as claimed in claim 2, wherein said collar is provided with a stop to restrict deflection of the collar lip, said stop being located at the place where said at least one passageway is established for said working chamber to communicate with the surrounding atmosphere.

5. A vibrator as claimed in claim 1, wherein said collar is fixed stationary on said base so that said outlet opening faces the working platform.

6. A vibrator as claimed in claim 3, wherein said collar is fixed stationary on said base so that said outlet opening faces the working platform.

7. A vibrator as claimed in claim 2, wherein said collar is fixed stationary on said working platform so that said outlet opening faces said base.

8. A vibrator as claimed in claim 4, wherein said collar is fixed stationary on said working platform so that said outlet opening faces said base.

* * * * *